J. L. McDERMUT, dec'd

G. E. HAYES, G. B. SNOW, T. G. LEWIS, J. E. ROBIE and J. Q. BRADT, Assignees of EMILY A. McDERMUT, Administratrix.

VULCANIZING APPARATUS FOR DENTISTS.

No. 7,272. Reissued Aug. 22, 1876.

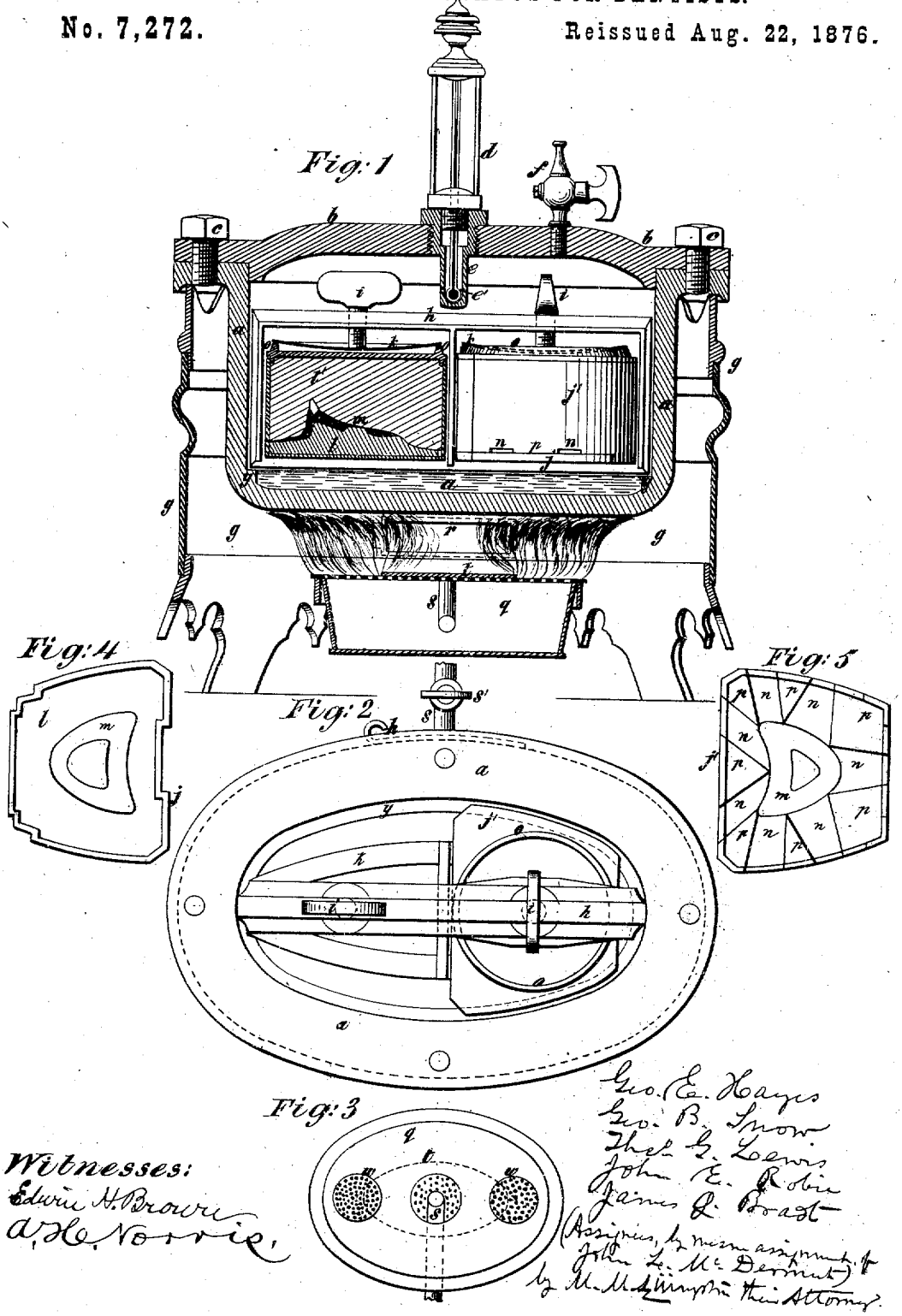

Witnesses:
Edwin H. Brown
A. H. Norris

Geo. E. Hayes
Geo. B. Snow
Thos. G. Lewis
John E. Robie
James Q. Bradt
(Assignees, by mesne assignments of John L. McDermut)
by M. M. Lumpkin their Attorney.

THE NORRIS PETERS CO., PHOTO-LITHO., WASHINGTON, D. C.

UNITED STATES PATENT OFFICE.

GEORGE E. HAYES, GEORGE B. SNOW, THEODORE G. LEWIS, JOHN E. ROBIE, AND JAMES Q. BRADT, OF BUFFALO, NEW YORK, ASSIGNEES OF EMILY A. McDERMUT, ADMINISTRATRIX OF JOHN L. McDERMUT, DECEASED.

IMPROVEMENT IN VULCANIZING APPARATUS FOR DENTISTS.

Specification forming part of Letters Patent No. 44,541, dated October 4, 1864; reissue No. 7,272, dated August 22, 1876; application filed May 10, 1875.

*To all whom it may concern:*

Be it known that JOHN L. McDERMUT, deceased, late of the city of New York, in the State of New York, heretofore invented a new and useful Process of and Apparatus for Molding and Vulcanizing Dental Plates; and the following is declared to be a full, clear, and exact description of the said invention, reference being had to the accompanying drawing, which forms part of this specification, and in which—

Figure 1 is a vertical central section of an apparatus embodying this invention, one of the flasks being shown in side elevation. Fig. 2 is a plan or top view of the same, with the cover and its appendages removed. Fig. 3 is an inverted plan view of a portion of the heating apparatus. Fig. 4 is a plan view of the bottom part or section of the flask containing a plaster cast or mold of an upper jaw, and Fig. 5 is a plan view of the face or lower side of the upper section of the flask containing a plaster cast or mold the reverse of that shown in Fig. 4.

This invention consists in a new method or process of molding a dental plate from a material which may be rendered plastic by heat, by placing and confining the mold or flask containing the said material in a close or covered vessel, and subjecting the mold and material contained therein, while so confined, to the combined and continuous influences of heat and mechanical pressure until the material is softened and the mold closed. It also consists in the process of molding and vulcanizing a vulcanite dental plate inside a steam-tight vessel by a continuous operation—that of molding being performed as above stated, after which the plate so molded is allowed to remain sufficiently long inside the vessel to be properly vulcanized, all without the necessity of handling or changing the position of the dental plate until finished. It also consists in the combination, with a close or covered vessel, and a dental mold or flask contained therein, of a mechanism by which the flask is closed while confined within the said vessel, and without strain upon the vessel itself from the force applied for the purpose, and simultaneously with the continued application of heat for the purpose of softening and rendering plastic the material contained in the mold, and out of which the dental plate is formed. It also consists in the combination, with such close or covered vessel and dental flask contained therein, of a yoke or cage and screw for regulating the pressure exerted upon said flask, and closing it while confined in said covered vessel. It also consists of the combination, with a dental flask contained in a yoke or cage, of an interposed spring, for producing a gradual pressure upon the flask, and closing it as the material contained therein yields by the application of heat, and a closed or covered vessel, in which the flask and its yoke or cage are contained, and by which the applied heat is concentrated and rendered more equable. It also consists in so constructing a steam-generating vessel that two flasks may be placed therein side by side, and on the same level, so that two sets of teeth may be molded and vulcanized under the same influences of temperature during the process of vulcanization, thereby insuring equal hardness in both.

In the accompanying drawing, *a* designates the body of the vessel, and *b* the cover thereof, which latter is shown as secured to said vessel by bolts *c*, passing through flanges, as will, by reference to Fig. 1, be more fully understood. The vessel *a* may be oblong, oval, or other suitable shape. An oblong vessel for holding two flasks side by side is shown. (See Figs. 1 and 2.)

Attached to the cover *b* is a thermometer and case, *d e*, of the usual construction. The vessel *a b* is shown as supported by a heating apparatus, *q*, supplied with gas through the pipe *s*, the amount of heat required being regulated by the cock *s'*. In Fig. 3 the heating apparatus is shown as inverted, and as exhibiting holes *w* in the bottom for supplying air, a perforated top plate through which the mingled air and gas pass burning on the upper side thereof, and an unperforated or distributing plate, *t*, for spreading the flame, shown in dotted outline.

The flasks *j j* (shown as closed in Fig. 1)

are composed of a lower part or section for containing the plaster cast for forming the obverse side of the plate, and an upper part or section for containing the plaster cast for forming the reverse side of the plate. The space within the mold *l l* determines the shape and form of the dental plate *m*, as usual. Channels *n* are cut in the face of the plaster casts, external to, and leading from, the mold *m*, to provide for the escape of surplus material.

A frame or cage, *h*, is provided for holding or receiving the flasks *j j*. A long or double frame is shown for holding the flasks side by side and on the same level, and the said frame is shown as supported on shoulders or projections *y* extending inwardly from the vessel, at or near the bottom thereof. Instead of the long frame just described, two shorter or single frames can be employed.

*i i* designate screws, which pass through sockets in the upper part of the frame *h*, so as to determine and regulate the pressure employed for closing the flasks for molding the material (when softened) of which the dental plates are composed. In order to obtain an automatic means for closing the flasks while confined in the vessel *a* by the cover *b*, and as the material composing the dental plate is softened by the heat applied, there are provided the flat springs *k*, whose outer ends bear upon annular projections *o* on the covers of the flasks *j j*. Each regulating-screw is so arranged that its lower end will press a spring, *k*, against the top of a flask. It will therefore be seen that the amount of pressure or power which it is designed or desired to use for the purpose of closing a flask inside the vessel *a b* may be regulated by operating a regulating screw, *i*.

In forming a dental plate the flask containing the mold and material for the dental-plate is placed inside the flask-holding frame, which latter is placed inside the vessel *a*, and the cover *b* closed. Upon sufficient heat being applied, the material of which the dental plate is to be formed will be softened, and, the flask closing upon it, it will be pressed or molded in a perfect manner.

By interposing packing between the flanges of the vessel *a* and its cover *b* it will be rendered steam-tight, and the plate, if of vulcanizable gum, being molded, as before described, may be also hardened or vulcanized before its removal from its position by allowing it to remain a sufficient length of time in the vessel, and at a proper heat.

It is well known that dental plates have been molded by the process of injection or filling the mold while closed with a fluid or semi-fluid material, which afterward forms the plate; but in such case the mold has been inserted into the heater in a closed condition.

Having thus described the invention of the said JOHN L. MCDERMUT, what is claimed, and desired to be secured by Letters Patent, is—

1. The within-described method or process of molding a dental plate by confining the mold and material therein contained, out of which the dental plate is to be formed, in a close or covered vessel, and subjecting them, while so confined, to the combined and continuous influences of heat and mechanical pressure until the material is softened and the mold closed, substantially as hereinbefore set forth.

2. The within-described method or process of molding and vulcanizing a dental plate by a continuous operation, consisting in closing the dental flask inside a steam-generator, thereby molding the plate, and then subjecting the plate so molded to the usual vulcanizing process without changing its position inside the generator, substantially as hereinbefore set forth.

3. The combination, with a dental flask, of a yoke or frame, an interposed spring, and a regulating-screw, whereby pressure upon the spring is adjusted, substantially as described.

4. The combination of a dental flask, a yoke or frame encircling the flask and bearing upon the same through an interposed spring, substantially as described, thereby closing the flask when inclosed within a heating-vessel.

5. The combination, with an oval, oblong, or other shaped vessel, of two flasks placed side by side on the same level in a double or two single clamping-frames, whereby two dental plates may be subjected to like influences of temperature during the process of vulcanization, substantially as hereinbefore set forth.

GEO. E. HAYES.
GEO. B. SNOW.
THEO. G. LEWIS.
JOHN E. ROBIE.
JAMES Q. BRADT.

Witnesses:
WILLIAM GRANT,
CHAS. ROTHERS.